Patented Jan. 10, 1950

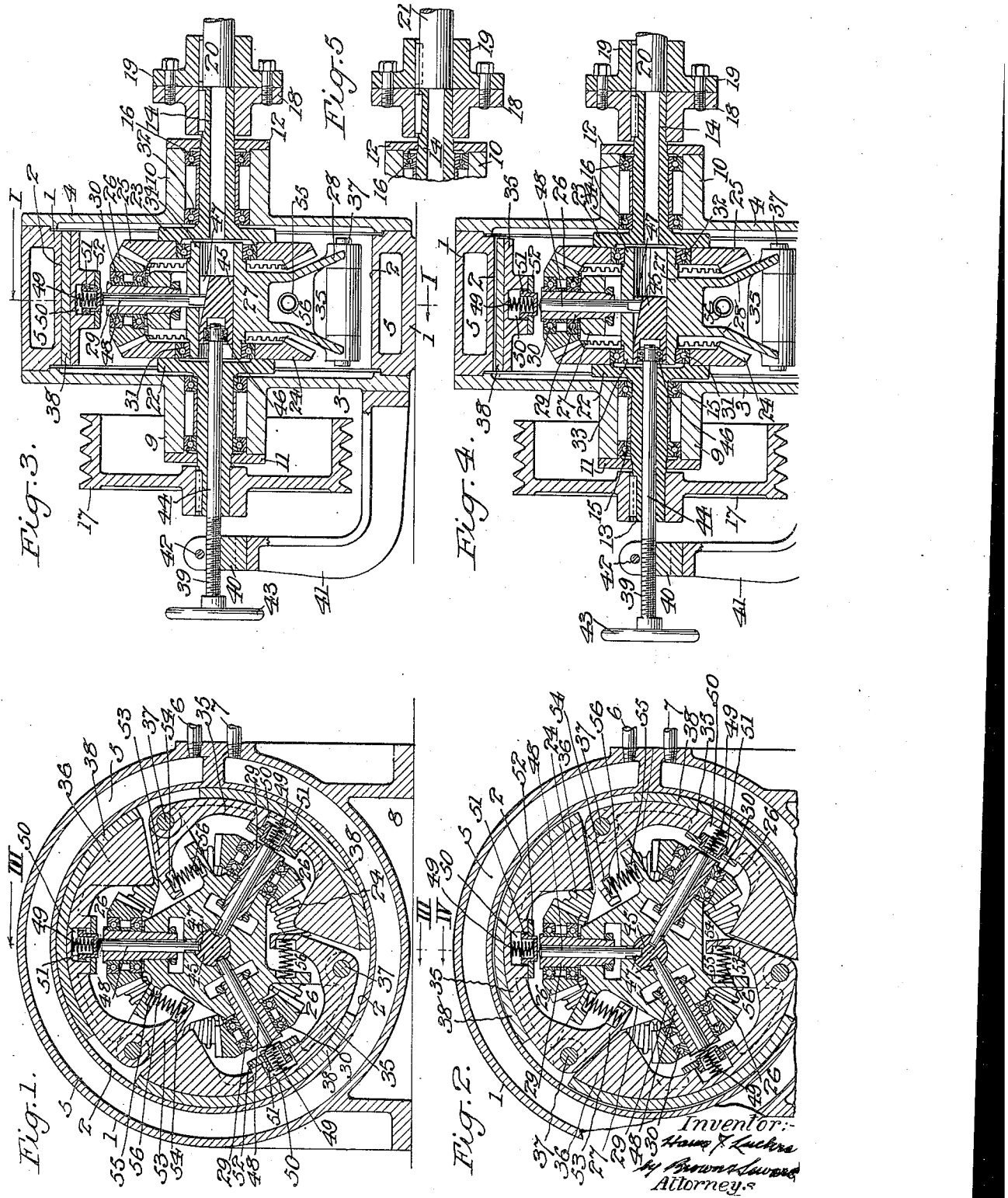

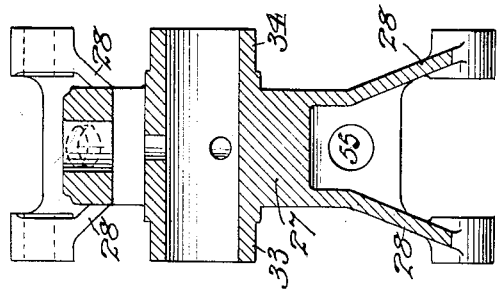
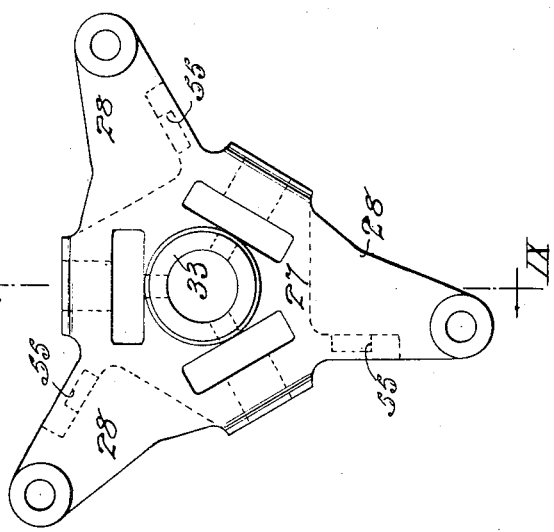
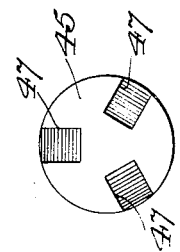
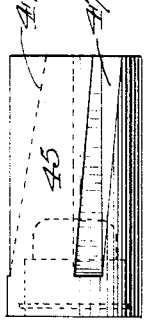
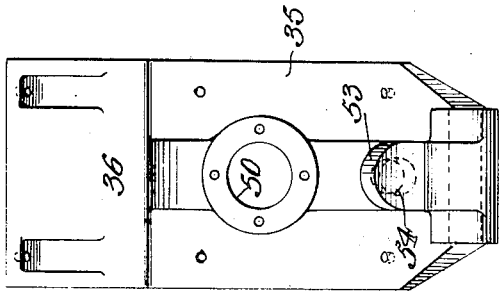
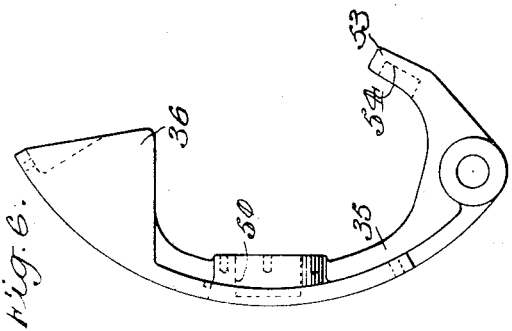

2,494,443

UNITED STATES PATENT OFFICE 2,494,443

DRIVING UNIT

Hans J. Luehrs, Westerly, R. I., assignor to C. B. Cottrell & Sons Company, Westerly, R. I., a corporation of Delaware Application June 6, 1946, Serial No. 674,899

11 Claims. (Cl. 74—752)

My invention consists in certain novel and useful improvements in driving units of the rotary centrifugal friction clutch type whereby the unit may be used without change in construction for driving web rewind rolls or for driving printing presses or other power machines.

One object of my invention is to provide a driving unit of the above character for a web rewind roll which will operate automatically on a principle whereby increasing centrifugal forces influencing the frictional resistance are applied approximately directly proportional to the increasing torque.

Another object is to provide a driving unit of the above character for printing or other power driven machinery, the varying centrifugal force influencing the frictional resistance to automatically maintain a constant speed under varying loads which occur in the machine while in operation.

My invention includes alined rotary driving, driven and intermediate elements, a fixed housing having an inner annular friction surface concentric with the common axis of the said rotary elements and a weighted brake shoe pivoted on the rotary intermediate element in position to be swung by centrifugal force into contact with the inner annular friction surface of the said housing.

My invention also includes a manually adjustable spring means acting on the centrifugally operated friction shoe to vary the frictional resistance created by said centrifugal force.

My invention also includes counterbalancing spring means for yieldingly holding the weighted friction shoe out contact with the inner annular friction surface of the fixed housing when the rotary intermediate element is at rest.

My invention also includes various novel and useful constructional features which will be hereinafter more specifically described.

A practical embodiment of my invention is represented in the accompanying drawings in which:

Fig. 1 represents a vertical central section taken through the driving unit in the plane of the line I—I of Fig. 3, looking in the direction of the arrows, showing three brake shoes in frictional contact with the inner annular friction surface of the housing;

Fig. 2 represents a similar detail section with the brake shoes released from their frictional contact with said inner annular friction surface;

Fig. 3 represents a vertical longitudinal section taken in the plane of the line III—III of Fig. 1, looking in the direction of the arrows;

Fig. 4 represents a similar view taken in the plane of the line IV—IV of Fig. 2, looking in the direction of the arrows;

Fig. 5 represents a detail section showing a printing or other power machine shaft attached to the driven shaft of the driving unit;

Fig. 6 represents an enlarged side view of one of the friction shoes;

Fig. 7 represents a face view of the same;

Fig. 8 represents a side view of the intermediate element or spider;

Fig. 9 represents a vertical section taken in the plane of the line IX—IX of Fig. 8, looking in the direction of the arrows;

Fig. 10 represents a still further enlarged side view of the brake shoe adjusting cam; and Fig. 11 represents an end view of the same.

The fixed housing for mounting the several rotary elements of the variable speed driving unit comprises the cylinder 1 having an inner annular friction surface 2, and the end covers 3 and 4. The cylinder 1 may be cooled by a suitable cooling medium. In the present instance, the cylinder is shown as jacketed for liquid cooling. The annular cooling chamber 5 is in open communication with the cooling liquid inlet and outlet ports 6 and 7, which ports may be connected to a suitable cooling liquid circulating system, not shown herein. This cylinder 1 may be provided with a suitable base 8. The covers 3 and 4 are provided with outwardly projecting hollow bosses 9 and 10 closed by end plates 11 and 12.

The axially alined rotary elements are shown as including driving and driven shafts 13 and 14 which are rotatively mounted in their respective bosses 9 and 10, suitable pairs of anti-friction bearings 15 and 16 being interposed between the said shafts and their respective bosses. The driving shaft 13 has a pulley 17 keyed to its outer end beyond the boss 9, said pulley being driven at a constant speed from a suitable power source, not shown herein.

The outer end of the driven shaft 14 is provided with one member 18 of a coupling keyed thereto, the other member 19 of the coupling being keyed in one instance as shown in Figs. 1 to 4 inclusive to the shaft 20 of a web rewind roll, and in the other instance as shown in Fig. 5 to the shaft 21 of a printing or other power driven machine.

The inner ends of these drive and driven shafts are provided with flanges 22 and 23 to which are fastened the bevel gears 24 and 25 of a differential gearing operatively connected in the present instance by three bevel pinions 26 carried by the rotary intermediate element or spider 27 having three pairs of arms 28.

The bevel pinions 26 are shown as rotatively mounted on three radially disposed hollow sleeves 29 secured to the spider 27, suitable pairs of anti-friction bearings 30 being interposed between said hollow sleeves and bevel pinions.

Anti-friction bearings 31 and 32 are located between the hollow bosses 33 and 34 of the spider 27 and the bevel gears 24 and 25 of the differential gearing.

In the present instance three brake shoes 35 weighted at their free ends as shown at 36 are shown as pivoted by cross pins 37 on the three pairs of arms 28 of the spider 27 in position to be swung by centrifugal force into frictional contact with the inner annular surface 2 of the cylindrical member 1 of the fixed housing. The outer convexly curved faces of these friction shoes are shown as provided with the usual brake linings 38.

The manually operated spring means acting on the friction shoes 35 for adjusting the frictional resistance created by the centrifugal forces is herein shown as comprising the following elements. A friction shoe adjusting hand screw 39 is threaded in a split bearing 40 carried by a bracket arm 41 projecting from the housing cover 3. A clamp screw 42 carried by the split bearing 40 serves to lock the hand screw 39 in its various endwise adjustments. This hand screw may be provided with a suitable hand wheel 43.

The non-threaded portion 44 of the hand screw extends through the axial bore of the driving shaft 13 and a cam 45 which is axially slidable in the bore of the spider 27 is rotatively secured to the inner end of the hand screw. A suitable anti-friction bearing 46 is shown as located between said cam 45 and the inner end of the hand screw. This cam 45 is shown in the present instance as having three longitudinal cam grooves 47 for receiving the flattened inner ends of radially slidable brake shoe adjusting pins 48 extending through the bores of the sleeves 29 on which the bevel pinions 26 are rotatively mounted. The interlocking engagement of the walls of these cam grooves with the flattened inner ends of the pins 48 will cause the cam 45 to rotate with the spider 27.

Expansion coil springs 49 are located in recesses 50 in the inner faces of the brake shoes 35 between the bottoms of the recesses and slidable spring retainers 51 which are engaged by the outer ends of the brake shoe adjusting pins 48. Cover plates 52 may be provided for these spring retainers 51. These springs 49 are initially loaded by the cover plates 52. Slight clearances are thus provided between the retainers 51 and the adjusting pins 48 while the clutch is in its disengaged position as shown in Figs. 3 and 4. These clearances will prevent any interference of the springs 49 while the counterbalance springs 56, to be hereinafter described, are acting against the centrifugal force of the weights 36 of the brake shoes 35, to hold the clutch in its disengaged position.

The weighted brake shoes 35 are provided with inwardly projecting arms 53 having recesses 54 located opposite recesses 55 in the spider 27. Counterbalance springs 56 for the weighted brake shoes 35 have their opposite ends seated in the said recesses 54 and 55 and serve to exert sufficient pressure to swing the brake shoes inwardly against the reduced pressure of the expansion springs 49 when the cam 45 is withdrawn to its retracted position shown in Figs. 2 and 4, to inactuate the unit.

When the driving unit is used as a web rewind roll drive the power applied to the pulley 17 to drive it at a constant speed in one direction is transmitted through the driving shaft 13, the bevel gear 24, the bevel pinions 26, the bevel gear 25, the driven shaft 14 and the coupling members 18 and 19 to drive the web rewind roll shaft 20. As the roll being rewound builds up, the rewind roll shaft 20 runs at a gradually decreasing speed due to the tension of the web, thus causing the spider 27 with the weighted brake shoes 35 to rotate in the housing at a gradually increasing speed in the same direction as the pulley 17. This gradual increasing speed of the spider 27 creates a gradually increasing force on the brake shoes, thus building up frictional resistances which are approximately directly proportional to the speed of the spider and thereby a proportionally increasing torque on the rewind roll shaft 20.

It will be understood that the frictional resistance created by this centrifugal force may be increased by the expansion spring 49 through its manual adjustment by the brake shoe adjusting pins 48, their actuating cam 45 and hand wheel 43 when the hand wheel is turned in a clockwise direction. This manual adjustment of the compression of the expansion spring 49 may be necessary for the initial setting of the spring 49 to handle stocks of different weights. After the adjustment has been made for a certain weight of stock the centrifugal forces will automatically take care of the gradually increasing torque as the roll builds up.

When it is desired to inactivate the unit the hand wheel 43 may be turned in an anti-clockwise direction sufficiently to break the frictional contact between the brake shoe and the inner annular friction surface of the fixed housing. The heavy counterbalance coil springs 56 help to maintain the brake shoes in this position out of contact with their said annular friction surface.

When this driving unit is to be used in connection with a printing or other power driven machine the power applied to the pulley 17 to drive it at a constant speed is transmitted by the elements above described, to the shaft 21 shown in Fig. 5. A description of the operation of the drive follows: Let it be assumed, for instance, that the driven shaft 14 is at a standstill and that the drive shaft 13 is being driven at a constant speed of 1800 R. P. M. Let it also be assumed that the hand screw 44 has been turned in a direction to withdraw the axially slidable cam 45 and thereby allow the radially slidable brake shoe adjusting pins 48, carried by the spider 27, to slide inwardly away from their friction brake shoes 35 (see Figs. 2 and 4). Under these conditions the driven shaft 14 will be stationary and the spider 27 will be driven at 900 R. P. M. in the same direction as the drive shaft without imposing any torque on the driven shaft 14, because the forces of the counterbalance springs 56 will slightly exceed the maximum centrifugal forces of the friction brake shoes 35 rotating at 900 R. P. M.

To start the drive, the hand wheel 43 is manipulated to turn the hand screw 44 in a direction to move the cam 45 into position to force the brake shoe adjusting pins 48 outwardly against the loading springs 49 of the brake shoes 35 (see Figs. 1 and 3). This additional manually adjustable pressure, combined with the centrifugal forces, overcomes the forces of the counter balance springs 56 and will bring the friction shoes 35 into frictional engagement with the inner annular friction surface 2 of the cylinder 1, thereby slowing the revolution of the spider 27 to an assumed speed of 675 R. P. M. minimum, depending on the position of the manually adjustable cam 45. Since the drive shaft 13 is maintained at a constant speed in one direction of 1800 R. P. M., for instance, the driven shaft 14 will simultaneously start to revolve in the opposite direction and will finally be caused to assume a constant speed up to a maximum speed of 450 R. P. M. depending on the setting of the manually adjustable cam 45 to hold the spider 27 to 450 R. P. M.

Assuming that the torque on the driven shaft 14 created by the web tension on the rewind shaft 20 or on the load on the machine shaft 21, as the case may be, is constant at 450 R. P. M. After this, or any speed within the range 675 R. P. M. to 450 R. P. M. is obtained by the initial manual setting of the hand wheel 43, no speed variation of the spider 27 will take place, as the manually set frictional resistance of the friction brake shoes 35, carried by the spider 27, is constant and therefore in perfect equilibrium with the required constant torque. However, if this equilibrium is disturbed by an increased torque on the driven shaft 14 by the increased web tension on the shaft 20 or the increased load on the shaft 21, the speed of the driven shaft 14 will tend to decrease while the speed of the spider 27 will increase. This increased speed will create additional centrifugal forces and thereby increased frictional resistance to hold the spider 27 and the driven shaft 14 at approximately their pre-set speeds.

Furthermore, if the equilibrium is disturbed by a decreased torque or torsional load on the driven shaft 14, the speed of the driven shaft 14 will tend to increase while the speed of the spider 27 will decrease. This decreased speed of the spider 27 will create diminishing centrifugal forces and decreased frictional resistance to hold the spider 27 and the driven shaft 14 at approximately their pre-set speeds.

It is realized that these pre-set speeds can be held only within a certain range if torque variations are encountered. However, this range can be held to a minimum if the drive is sensitive, the coefficient of the friction between the brake shoes 35 and the inner annular friction surface 2 being high and the relation of the centrifugal forces through the frictional pressure created thereby is of high proportions.

Furthermore it will be seen that this driving unit when used in connection with a web rewind roll shaft creates maximum torque requirements while the spider is at its maximum speed and the rewind web roll is at a low speed requiring maximum torque.

While I have shown the driving unit as provided with a differential gearing having three bevel pinions connecting the bevel gears of the driving and driven shafts it will be understood that any number of these bevel pinions may be used.

While I have shown the intermediate rotary element as having three brake shoes pivoted thereon it will be understood that any desired number of brake shoes may be used.

It is evident that various changes may be resorted to in the construction, form and arrangement of the several parts without departing from the spirit and scope of my invention, and hence I do not intend to be limited to the particular embodiment herein shown and described.

What I claim is:

1. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, and a manually adjustable spring means acting on the brake shoe to vary its frictional resistance created by said centrifugal force.

2. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, and a manually adjustable spring means acting on the brake shoe to gradually increase its frictional resistance created by said centrifugal force.

3. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, and a manually adjustable spring means acting on the brake shoe to adjust its initial setting.

4. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, and a manually adjustable spring means acting on the brake shoe to adjust its initial setting and to vary its frictional resistance created by said centrifugal force.

5. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, and a manually adjustable spring means acting on the brake shoe to adjust its initial setting and to gradually increase its frictional resistance created by said centrifugal force.

6. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, a manually adjustable spring means movable into its operative position to act on the brake shoe to vary its frictional resistance created by said centrifugal force, and counterbalancing spring means operating, when the manually adjustable spring means is moved to its inoperative position, to overcome the centrifugal force of the brake shoe and yieldingly hold the brake shoe out of contact with the said annular friction surface and thereby stop the driven element.

7. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, and a manually adjustable spring means acting on the brake shoe to vary its frictional resistance created by said centrifugal force, comprising a hand screw carried by the housing and extending axially through the driving element, a cam axially slidable in the intermediate element and rotatively connected to said hand screw, a radially slidable brake shoe adjusting pin having its inner end engaged by said cam, and an initially loaded expansion spring located between the outer end of the pin and the brake shoe.

8. In a driving unit, alined rotary driving, driven and intermediate elements, a differential gearing operatively connecting said elements, a fixed housing having an inner annular friction surface, a weighted brake shoe pivoted on said intermediate element in position to be swung by centrifugal force into contact with said annular friction surface, a manually adjustable spring means movable into its operative position to act on the brake shoe to vary its frictional resistance created by this centrifugal force, said manually adjustable spring means comprising a hand screw carried by the housing and extending axially through the driving element, a cam axially slidable in the intermediate element and rotatably connected to said hand screw, a radially slidable brake shoe adjusting pin having its inner end engaged by said cam, an expansion spring located between the outer end of the pin and the brake shoe, and counterbalancing spring means operable, when the cam is moved to its inoperative position, to overcome the centrifugal force of the brake shoe and yieldingly hold the brake shoe out of contact with the annular friction surface and thereby stop the driven element.

9. In a rewinding roll driving unit, a constant speed rotary driving shaft, a rotary driven shaft, a rewind roll shaft operatively connected thereto, an intermediate rotary element, a differential gearing operatively connecting the driving and driven shafts through the said intermediate element, a fixed housing having an inner annular friction surface, a brake shoe pivoted on said intermediate element in position to be swung by centrifugal force into contact with said annular friction surface with an increasing frictional resistance proportional to the increasing torque exerted on the intermediate element by the rewind roll shaft, to drive the rewind roll shaft at a uniformly decreasing speed, and manually adjustable spring means acting on the brake shoe to increase its frictional resistance created by this centrifugal force.

10. In a machine driving unit, a constant speed rotary driving shaft, a rotary driven shaft, a machine shaft operatively connected thereto, an intermediate rotary element, a differential gearing operatively connecting the driving and driven shafts through the intermediate element, a fixed housing having an inner annular friction surface, a weighted brake shoe pivoted on said intermediate element in position to be swung by centrifugal force into contact with the said annular friction surface with a frictional resistance proportional to the torque exerted by the machine shaft on the intermediate element, to maintain the machine shaft at a predetermined speed under varying loads, and a manually operated spring means acting on the brake shoe for gradually increasing its frictional resistance, to start the machine shaft and accelerate it to a predetermined speed.

11. In a machine driving unit, a constant speed rotary driving shaft, a rotary driven shaft, a machine shaft operatively connected thereto, an intermediate rotary element, a differential gearing operatively connecting the driving and driven shafts through the rotary element, a fixed housing having an inner annular friction surface, a weighted brake shoe pivoted on said intermediate element in position to be swung by centrifugal force into contact with the said annular friction surface with a frictional resistance proportional to the torque exerted by the machine shaft on the intermediate element, to maintain the machine shaft at a predetermined speed under varying loads, a manually operated spring means acting on the brake shoe for gradually increasing its frictional resistance to start the machine shaft and accelerate it to a predetermined speed, said manually operated spring means comprising a hand screw mounted on the housing and extending axially through the driving shaft, a cam axially slidable in the intermediate element and rotatably connected to said hand screw, an expansion spring in contact with the brake shoe, and a rod radially slidable in the intermediate element and located between and in contact with said cam and spring whereby the axial movement of the cam will increase or decrease the pressure of the spring on said brake shoe.

HANS J. LUEHRS.

REFERENCES CITED

The following references are of record in the file of this patent:

UNITED STATES PATENTS

| Number | Name | Date |
|---|---|---|
| 885,207 | Whitcomb | Apr. 21, 1908 |
| 942,192 | Barton | Dec. 7, 1909 |
| 1,112,429 | Bornholt | Oct. 6, 1914 |
| 1,180,343 | Turner | Apr. 25, 1916 |
| 1,192,704 | Stoke | July 25, 1916 |
| 1,775,741 | Thomas | Sept. 16, 1930 |
| 1,817,006 | Kratzer | Aug. 4, 1931 |
| 1,941,360 | Mattias | Dec. 26, 1933 |
| 1,996,815 | Kimpton | Apr. 9, 1935 |
| 2,261,555 | Luehrs | Nov. 4, 1941 |
| 2,324,703 | Hoffman | July 20, 1943 |

FOREIGN PATENTS

| Number | Country | Date |
|---|---|---|
| 323,527 | Great Britain | Jan. 6, 1930 |
| 573,771 | France | Mar. 17, 1924 |
| 593,759 | France | June 6, 1925 |
| 825,644 | France | Mar. 9, 1938 |